(12) United States Patent
Matsumoto

(10) Patent No.: US 10,654,132 B2
(45) Date of Patent: May 19, 2020

(54) LASER MACHINING SYSTEM

(71) Applicant: FANUC CORPORATION, Minamitsuru-gun, Yamanashi (JP)

(72) Inventor: Takayoshi Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/151,887

(22) Filed: Oct. 4, 2018

(65) Prior Publication Data
US 2019/0126404 A1 May 2, 2019

(30) Foreign Application Priority Data
Oct. 30, 2017 (JP) .................................. 2017-209512

(51) Int. Cl.
*B23K 26/38* (2014.01)
*B23K 26/082* (2014.01)

(52) U.S. Cl.
CPC ............ *B23K 26/38* (2013.01); *B23K 26/082* (2015.10)

(58) Field of Classification Search
CPC ....... B23K 26/38; B23K 26/082; B23K 26/08
USPC ............. 219/121.63, 121.67, 121.68, 121.83
See application file for complete search history.

(56) References Cited

U.S. PATENT DOCUMENTS

| 5,233,150 A * | 8/1993 | Schneebeli | B23K 9/044 219/76.14 |
| 6,430,472 B1 * | 8/2002 | Boillot | G05B 19/056 219/121.61 |
| 6,617,544 B1 * | 9/2003 | Tsukamoto | B23K 26/08 219/121.79 |
| 6,635,849 B1 * | 10/2003 | Okawa | B23K 26/043 219/121.7 |

(Continued)

FOREIGN PATENT DOCUMENTS

| CN | 102728953 | 10/2012 |
| JP | 2006-344052 | 12/2006 |

(Continued)

OTHER PUBLICATIONS

Office Action dated Mar. 4, 2020 in Chinese Patent Application No. 201811260170.8.

*Primary Examiner* — Jimmy Chou
(74) *Attorney, Agent, or Firm* — Wenderoth, Lind & Ponack, L.L.P.

(57) ABSTRACT

A laser machining system includes: a scanner that scans a laser beam L along a predetermined radiation path and at a predetermined radiation speed; a robot that moves the scanner along a predetermined moving path and at a predetermined move speed; a robot controller that controls the moving path and the move speed of the robot; and a scanner controller that controls the radiation path and the radiation speed of the scanner. The scanner controller determines whether the predetermined radiation path exceeds a radiation range of the scanner within a radiation time of the (Continued)

predetermined radiation path and transmits a determination result to the robot controller as radiation range determination information. The robot controller changes the predetermined move speed to be decelerated on the basis of the radiation range determination information received from the scanner controller.

3 Claims, 12 Drawing Sheets

(56) References Cited

U.S. PATENT DOCUMENTS

| | | | |
|---|---|---|---|
| 6,858,814 B2 * | 2/2005 | Fischer | B25J 19/0037 219/121.67 |
| 10,413,994 B2 * | 9/2019 | Aoki | B23K 26/046 |
| 2004/0124227 A1 * | 7/2004 | Seki | B23K 9/0953 228/103 |
| 2004/0206735 A1 * | 10/2004 | Okuda | B23K 26/04 219/121.78 |
| 2005/0102060 A1 * | 5/2005 | Watanabe | B25J 9/1697 700/245 |
| 2005/0107919 A1 * | 5/2005 | Watanabe | B25J 9/1656 700/245 |
| 2005/0150876 A1 * | 7/2005 | Menin | B23K 26/0884 219/121.63 |
| 2005/0258152 A1 * | 11/2005 | Kawamoto | B23K 26/03 219/121.62 |
| 2006/0060573 A1 * | 3/2006 | Becker | B23K 26/0884 219/121.64 |
| 2006/0072809 A1 * | 4/2006 | Hashimoto | B25J 9/1697 382/153 |
| 2006/0175301 A1 * | 8/2006 | Rippl | B23K 26/0884 219/121.8 |
| 2006/0226128 A1 * | 10/2006 | Otsuka | B23K 26/0884 219/121.64 |
| 2007/0075054 A1 * | 4/2007 | Nakamura | B23K 26/04 219/121.61 |
| 2007/0210040 A1 * | 9/2007 | Sakamoto | B23K 26/0884 219/121.63 |
| 2007/0221638 A1 * | 9/2007 | Yoshikawa | B23K 26/0884 219/121.63 |
| 2008/0035619 A1 * | 2/2008 | Hamaguchi | B23K 26/04 219/121.79 |
| 2008/0172143 A1 * | 7/2008 | Schwarz | B23K 26/0861 700/166 |
| 2009/0007933 A1 * | 1/2009 | Thomas | B08B 7/0042 134/1 |
| 2009/0095722 A1 * | 4/2009 | Ehrmann | B23K 26/06 219/121.72 |
| 2010/0174407 A1 * | 7/2010 | Fukawa | B23K 26/04 700/245 |
| 2011/0198322 A1 * | 8/2011 | Manens | B23K 26/032 219/121.72 |
| 2011/0253690 A1 * | 10/2011 | Dane | G02B 27/0927 219/121.74 |
| 2012/0255937 A1 * | 10/2012 | Oe | B23K 26/0884 219/121.63 |
| 2012/0255938 A1 * | 10/2012 | Oe | B23K 26/0884 219/124.22 |
| 2013/0201634 A1 * | 8/2013 | Im | C30B 1/08 361/748 |
| 2015/0231738 A1 * | 8/2015 | Ota | B23K 26/382 219/121.71 |
| 2015/0273624 A1 * | 10/2015 | Yoshida | C03C 27/00 428/209 |
| 2016/0008905 A1 * | 1/2016 | Izawa | B25J 15/0019 219/130.1 |
| 2016/0187646 A1 * | 6/2016 | Ehrmann | G02B 13/0095 219/121.73 |
| 2018/0333805 A1 * | 11/2018 | Matsumoto | B23K 26/0884 |
| 2019/0061064 A1 * | 2/2019 | Murakami | B23K 26/0821 |
| 2019/0143412 A1 * | 5/2019 | Buller | B23K 26/0643 219/76.12 |
| 2019/0200000 A1 * | 6/2019 | Kumagai | B23K 26/032 |

FOREIGN PATENT DOCUMENTS

| | | |
|---|---|---|
| JP | 2010-214393 | 9/2010 |
| JP | 2012-139711 | 7/2012 |
| JP | 2018-507109 | 3/2018 |

* cited by examiner

AFTER ELAPSING OF Ts

LASER MACHINING SYSTEM

This application is based on and claims the benefit of priority from Japanese Patent Application No. 2017-209512, filed on 30 Oct. 2017, the content of which is incorporated herein by reference.

BACKGROUND OF THE INVENTION

Field of the Invention

The present invention relates to a system that performs laser machining using a scanner that scans a laser beam and a robot that moves the scanner.

Related Art

A technique of remote laser welding (machining) of radiating a laser beam from a position distant from a work to perform welding (machining) of the work is known. As a laser machining system that employs such a technique, a system which uses a scanner that scans a laser beam and a robot that moves the scanner is known. Such a laser machining system can weld (machine) a work in an arbitrary shape by the scanner scanning a laser beam while the scanner is being moved by a robot.

Patent Document 1 discloses such a laser welding apparatus. This laser welding apparatus includes a robot controller that controls a robot, a scanner controller that controller a scanner, and a central control unit. The central control unit controls both the scanner controller and the robot controller.

Patent Document 1: Japanese Unexamined Patent. Application, Publication No. 2010-214393

SUMMARY OF THE INVENTION

However, in the invention related to Patent Document 1, an operation command from the central control unit to the scanner controller and an operation command from the central control unit to the laser welding apparatus are processed at the same control speed and the same control period. The scanner controller and the robot controller operate individually and independently.

The inventor of the present application devises a laser machining system in which a robot controller and a scanner controller operate independently by individual operation programs. In this laser machining system, the control of a moving path and a move speed of a robot by the robot controller is independent from the control of a scanning path (radiation path) and a scanning speed (radiation speed) of a scanner by the scanner controller. In order to realize this, the position or the move speed of a robot in operation is transmitted from the robot controller to the scanner controller, and a scanning path is created by taking the operation of the robot in the scanner controller into consideration.

However, when the scanning speed. (the radiation speed) of a scanner is faster than the move speed of a robot, the scanning path of the scanner deviates from a radiation range (generally approximately 300 ram by 300 mm) of the scanner before scanning by the scanner ends and it is not possible to perform laser machining. This is because the control of the moving path and the move speed of the robot by the robot controller is independent from the control of the scanning path (the radiation path) and the scanning speed (the radiation speed) of the scanner by the scanner controller, and therefore the robot cannot understand the radiation state of the scanner and continues moving at the programmed move speed thereof. As a countermeasure, the programmed move speed of the robot may be corrected by trial-and-error, and the command speed of the robot may be decreased to a move speed in which the scanning path of the scanner does not exceed the radiation range of the scanner until the scanning of the scanner ends. However, this countermeasure takes time.

An object of the present invention is to provide a laser machining system capable of performing laser machining appropriately even when a robot controller and a scanner controller perform control independently.

(1) A laser machining system (for example, a laser machining system 1 to be described later) according to the present invention includes: a scanner (for example, a scanner 4 to be described later) that scans a laser beam along a predetermined radiation path and at a predetermined radiation speed; a robot. (for example, a robot 2 to be described later) that moves the scanner along a predetermined moving path and at a predetermined move speed; a robot controller (for example, a robot controller 5 to be described later) that controls the moving path and the move speed of the robot; and a scanner controller (for example, a scanner controller 6 to be described later) that controls the radiation path and the radiation speed of the scanner, wherein the scanner controller determines whether the predetermined radiation path exceeds a radiation range of the scanner within a radiation time of the predetermined radiation path and transmits a determination result to the robot controller as radiation range determination information, and the robot controller changes the predetermined move speed to be decelerated on the basis of the radiation range determination information received from the scanner controller.

(2) in the laser machining system according to (1), the scanner controller may compute a move speed of the scanner so that a radiation path after the elapsing of the radiation time does not exceed the radiation range of the scanner on the basis of a starting position of the predetermined radiation path, the radiation range of the scanner, and a radiation time from start to end of the predetermined radiation path and transmits the computed move speed of the scanner by embedding the same in the radiation range determination information, and the robot controller may change the predetermined move speed to a move speed of the scanner included in the radiation range determination information.

(3) in the laser machining system according to (1), the robot controller may change the predetermined move speed to 0 and stop the robot.

(4) In the laser machining system according to any one of (1) to (3), the control of the radiation speed of the scanner by the scanner controller may be performed independently from the control of the move speed of the robot by the robot controller.

According to the present invention, it is possible to provide a laser machining system capable of performing laser machining appropriately even when a robot controller and a scanner controller perform control independently.

DETAILED DESCRIPTION OF THE INVENTION

Figure 1:
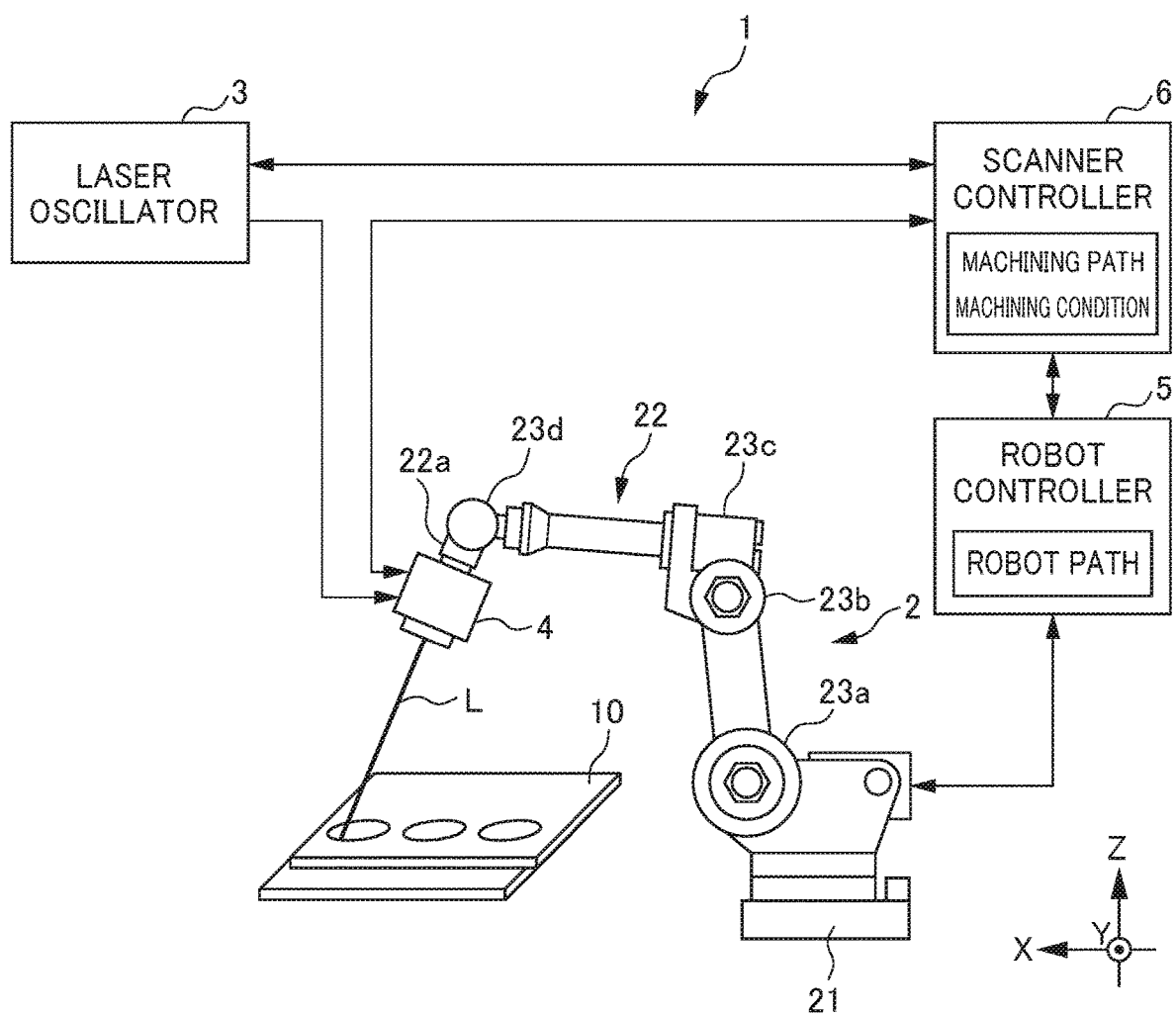
FIG. 1 is a diagram illustrating a configuration of a laser machining system according to the present embodiment.

Hereinafter, an example of an embodiment of the present invention will be described with reference to the accompanying drawings. The same or corresponding portions in the respective drawings will be denoted by the same reference numerals.

FIG. 1 is a block diagram illustrating a configuration of a laser machining system according to the present embodiment. A laser machining system 1 illustrated in FIG. 1 is a system that performs laser welding using a scanner 4 that scans a laser beam and a robot 2 that moves the scanner 4. The laser machining system 1 includes the robot 2, a laser oscillator 3, the scanner 4, a robot controller 5, and a scanner controller 6.

The robot 2 is a multi-joint robot having a plurality of joints and includes a base portion 21, an arm. 22, and joint axes 23a to 23d having a plurality of rotating axes. Moreover, the robot 2 has a plurality of robot servo motors (not illustrated) for rotating the respective joint axes 23a to 23d to move the arm 22 in X, Y, and Z directions. The robot servo motors are rotated on the basis of driving data from the robot controller 5 to be described later.

The scanner 4 is fixed to a distal end 22a of the arm 22 of the robot 2. Therefore, the robot 2 can move the scanner 4 in predetermined X and Y directions at a predetermined robot speed according to the driving of the robot servo motors and move the scanner 4 at an arbitrary position on a working space.

The laser oscillator 3 includes a laser medium, an optical resonator, an excitation source, and the like, which are not illustrated. The laser oscillator 3 generates a laser beam having a laser output based on a laser output command from the scanner controller 6 to be described later and supplies the generated laser beam to the scanner 4. Although examples of the type of a laser oscillated include a fiber laser, a $CO_2$ laser, a YAP laser, and the like, the type of a laser is not particularly limited in the present invention.

Figure 2:
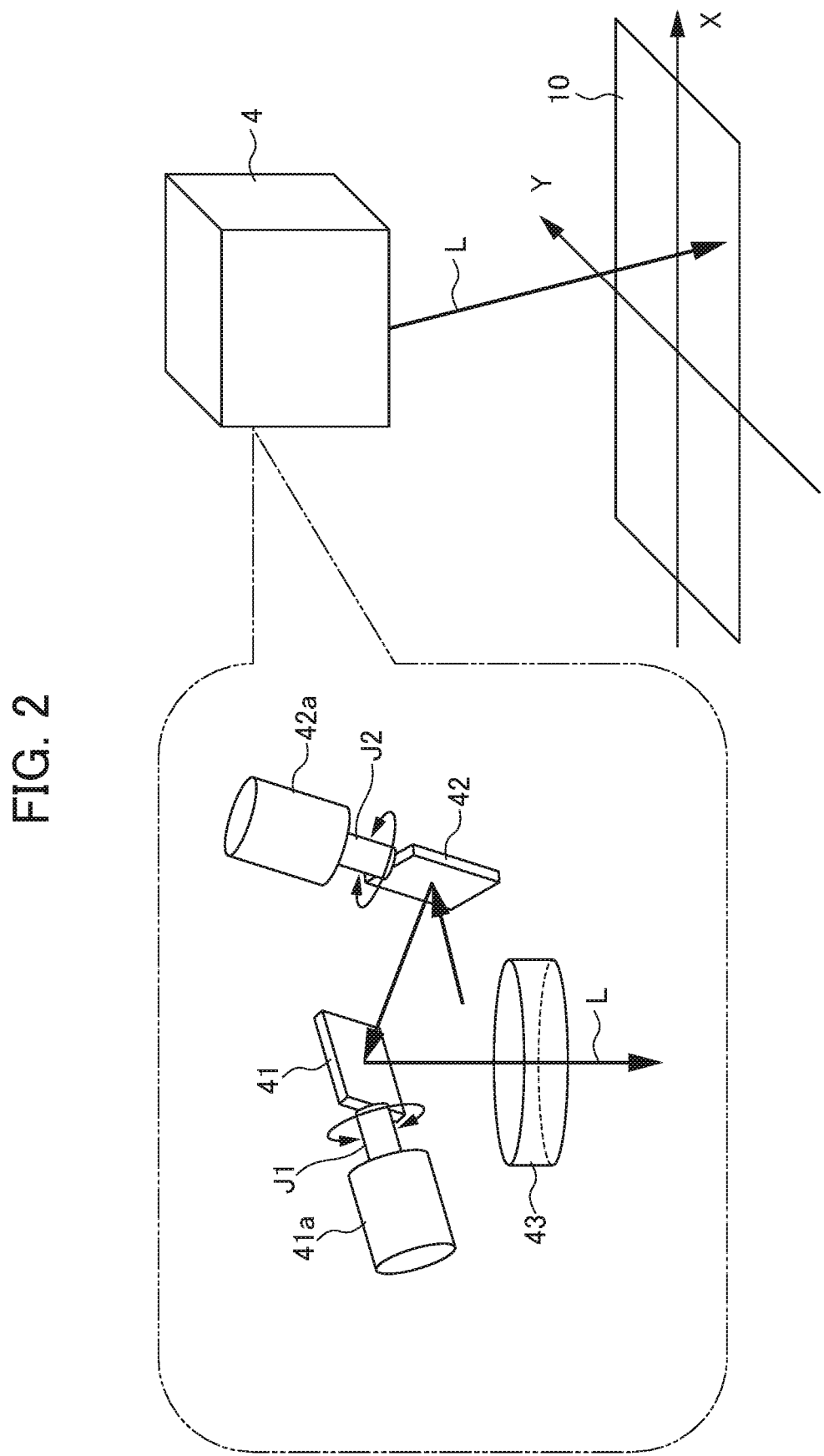
FIG. 2 is a diagram illustrating an optical system of a scanner illustrated in FIG. 1.

The scanner 4 is a galvano scanner capable of receiving a laser beam L emitted from the laser oscillator 3 and scanning the laser beam L with respect to a work 10. FIG. 2 is a diagram illustrating an optical system of the scanner 4 illustrated in FIG. 1. As illustrated in FIG. 2, the scanner 1 includes two galvano mirrors 41 and 42 that reflect the laser beam L emitted from the laser oscillator 3, galvano motors 41a and 42a that rotate the galvano mirrors 41 and 42, and a cover glass 43.

The galvano mirrors 41 and 42 can rotate around two rotating axes J1 and J2 orthogonal to each other. The galvano motors 41a and 42a rotate on the basis of driving data from the scanner controller 6 to be described later to cause the galvano mirrors 41 and 42 to rotate about the rotating axes J1 and J2.

The laser beam L emitted from the laser oscillator 3 is sequentially reflected by the two galvano mirrors 41 and 42 and is emitted from the scanner 4 to reach a machining point (a welding point) of the work 10. In this case, when the two galvano mirrors 41 and 42 are rotated by the galvano motors 41a and 42a, an incidence angle of the laser beam L incident on the galvano mirrors 41 and 42 changes continuously. As a result, the laser beam L is scanned from the scanner 4 to the work 10 along a predetermined path, and a welding trajectory is formed on the work 10 along the scanning path of the laser beam L.

The scanning path of the laser beam L emitted from the scanner 4 to the work 10 can be changed arbitrarily in X and Y directions by controlling the driving of the galvano motors 41a and 42a appropriately to change the rotation angles of the galvano mirrors 41 and 42.

The cover glass 43 is cylindrical and has a function of transmitting the laser beam L reflected sequentially by the galvano mirrors 41 and 42 and moving toward the work 10 and protecting the inside of the scanner 4.

Figure 3:
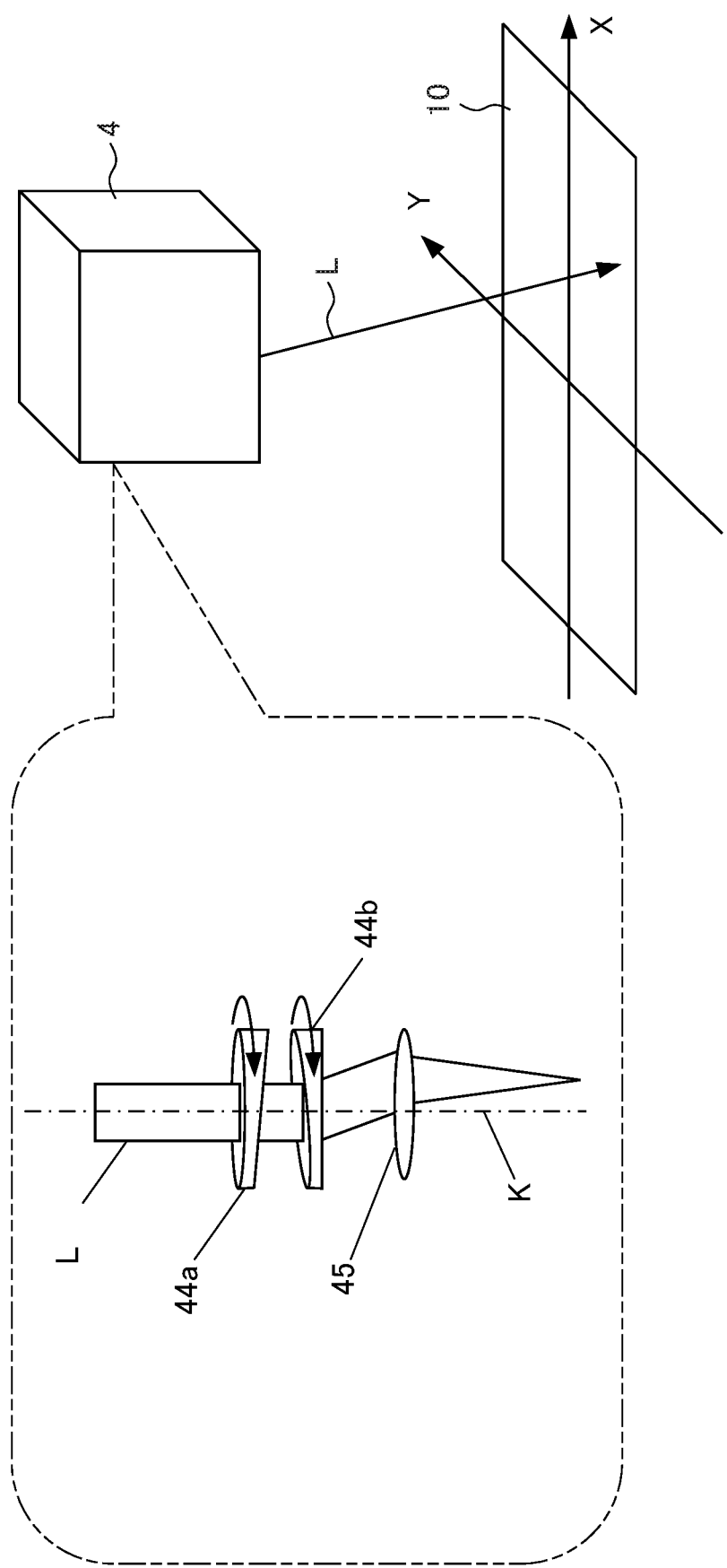
FIG. 3 is a diagram illustrating a different optical system of the scanner illustrated in FIG. 1.
Figure 4A:
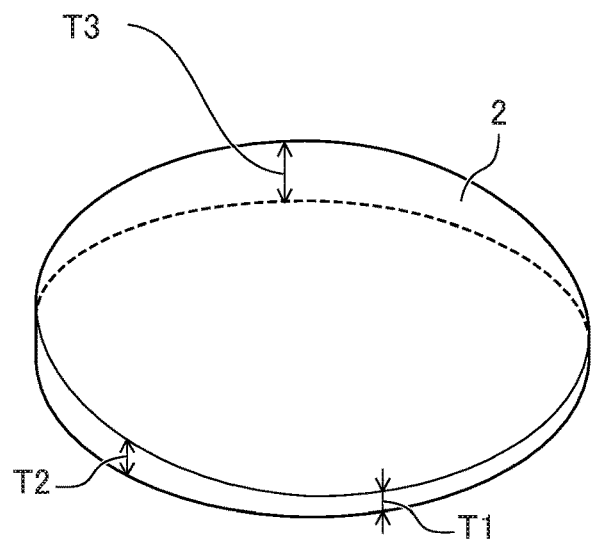
FIG. 4A is a diagram illustrating a different, optical system of the scanner illustrated in FIG. 3.
Figure 4B:
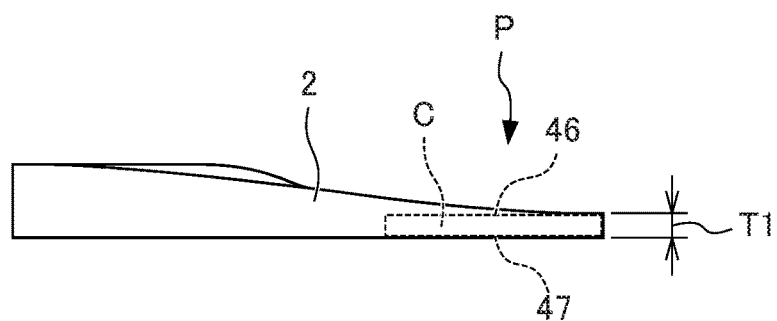
FIG. 4B is a diagram illustrating a different optical system of the scanner illustrated in FIG. 3.
Figure 4C:
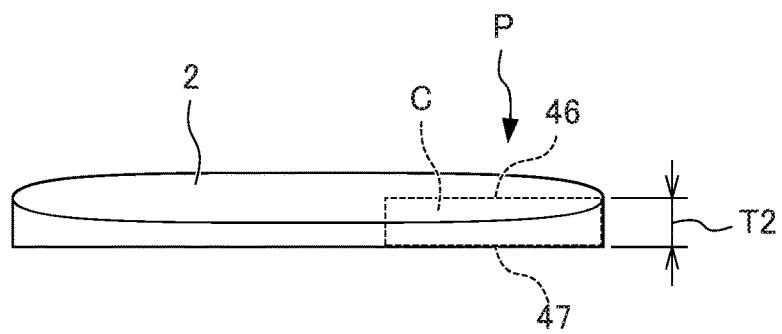
FIG. 4C is a diagram illustrating a different optical system of the scanner illustrated in FIG. 3.
Figure 4D:
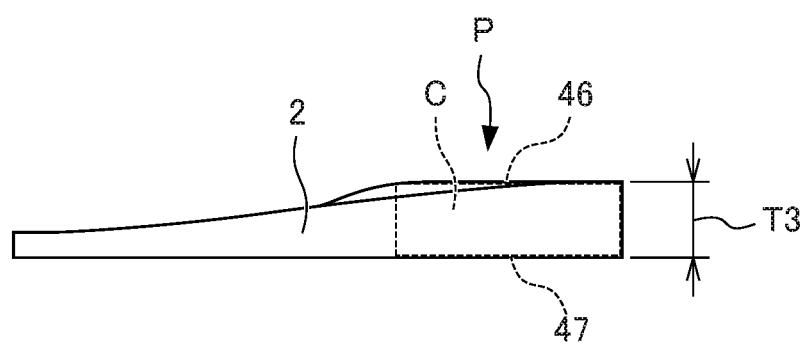
FIG. 4D is a diagram illustrating a different optical system of the scanner illustrated in FIG. 3.

Alternatively, as illustrated in FIG. 3, the scanner 4 is a trepanning scanner. In this case, the scanner 4 may have a configuration of refracting an incident laser beam so that the laser beam is radiated to an arbitrary position by rotating a lens having an inclined surface using a motor, for example.

Specifically, in the scanner 4, two prism lenses 44a and 44b (hereinafter, both will be collectively referred to as "prism lenses 44") and a condensing lens 45 are disposed to overlap each other so that the laser beam L is incident in a thickness direction, and the two prism lenses 44a and 44b rotate around a rotating axis K. In this way, a radiation position can be controlled on a two-dimensional plane.

As illustrated in FIGS. 4A to 4D, the prism lenses 44 are formed in a circular form, for example, an incidence-side edge (hereinafter referred to as an incidence edge) 46 of a cross-section C in the thickness T direction and an exit-side edge (hereinafter referred to as an exit edge) 47 are parallel to each other. That is, the thickness T of the prism lenses 44 in the rotation direction is constant. On the other hand, the thickness T of the prism lenses 44 in a circumferential direction changes continuously. Specifically, as illustrated in FIGS. 4A to 4D, the thickness T of the prism lenses 44 can take thicknesses represented by T1, T2, and T3, for example, and these thicknesses are in the relation of T1<T2<T3. These prism lenses 44 are rotated by a rotating motor and the thickness T changes continuously along the rotation direction thereof.

The laser beam L incident on the prism lenses 44 is refracted according to the refractive index of the prism lenses 44 and is output as a refracted beam. In this case, a beam position of the laser beam L shifted by refraction is correlated with the thickness T of the prism lenses 44. That is, the larger the thickness T of the prism lenses 44 at an incidence position P of the laser beam L, the larger the shift amount which is the shift of a beam position of the laser beam L due to refraction. When the laser beam L passes through the prism lenses 44, the thickness T of which changes continuously and periodically in the rotation direction, the beam position of the laser beam L (that is, the radiation position of the laser beam L) can be changed continuously and periodically.

Referring to FIG. 1, the robot controller 5 outputs driving control data to the respective robot servo motors of the robot 2 according to a predetermined operation program (including a robot moving path) to control the operation of the robot 2. That is, the robot controller 5 outputs driving control data to the respective robot servo motors to control the driving of the respective robot servo motors to thereby move the scanner 4 attached to the distal end 22a of the arm 22 in the X and Y directions with respect to the work 10. Moreover, the robot controller 5 supplies the position and the move speed (a command value or a feedback value) of the robot 2 to the scanner controller 6. Specifically, the position and the move speed of the robot 2 is the position and the move speed of the distal end 22a of the robot 2 (that is, the scanner 4).

The scanner controller 6 recognizes the start of laser machining on the basis of the position of the robot 2 supplied from the robot controller 5 (that is, the position of the scanner 4) and performs the operation control of the scanner 4 independently from the operation control of the robot 2 by the robot controller 5. The scanner controller 6 outputs a laser output command to the laser oscillator 3 so that a laser beam having a desired output is emitted according to a predetermined operation program (including machining conditions (laser radiation conditions such as power, frequency, and duty)). Moreover, the scanner controller 6 outputs driving control data to the galvano motors 41a and 42a of the scanner 4 according to a predetermined operation program (including a machining path (radiation start/ending timings)) to rotate the galvano mirrors 41 and 42 to control scanning of the laser beam L emitted from the scanner 4 to the work 10.

The robot controller 5 and the scanner controller 6 are configured as an arithmetic processor such as, for example, a digital signal processor (DSP) and a field-programmable gate array (FPGA). The functions of the robot controller 5 and the scanner controller 6 are realized by executing predetermined software (a program) stored in a storage unit, for example. The functions of the robot controller 5 and the scanner controller 6 may be realized by the cooperation of hardware and software and may also be realized by hardware (electronic circuit) only.

Figure 5:
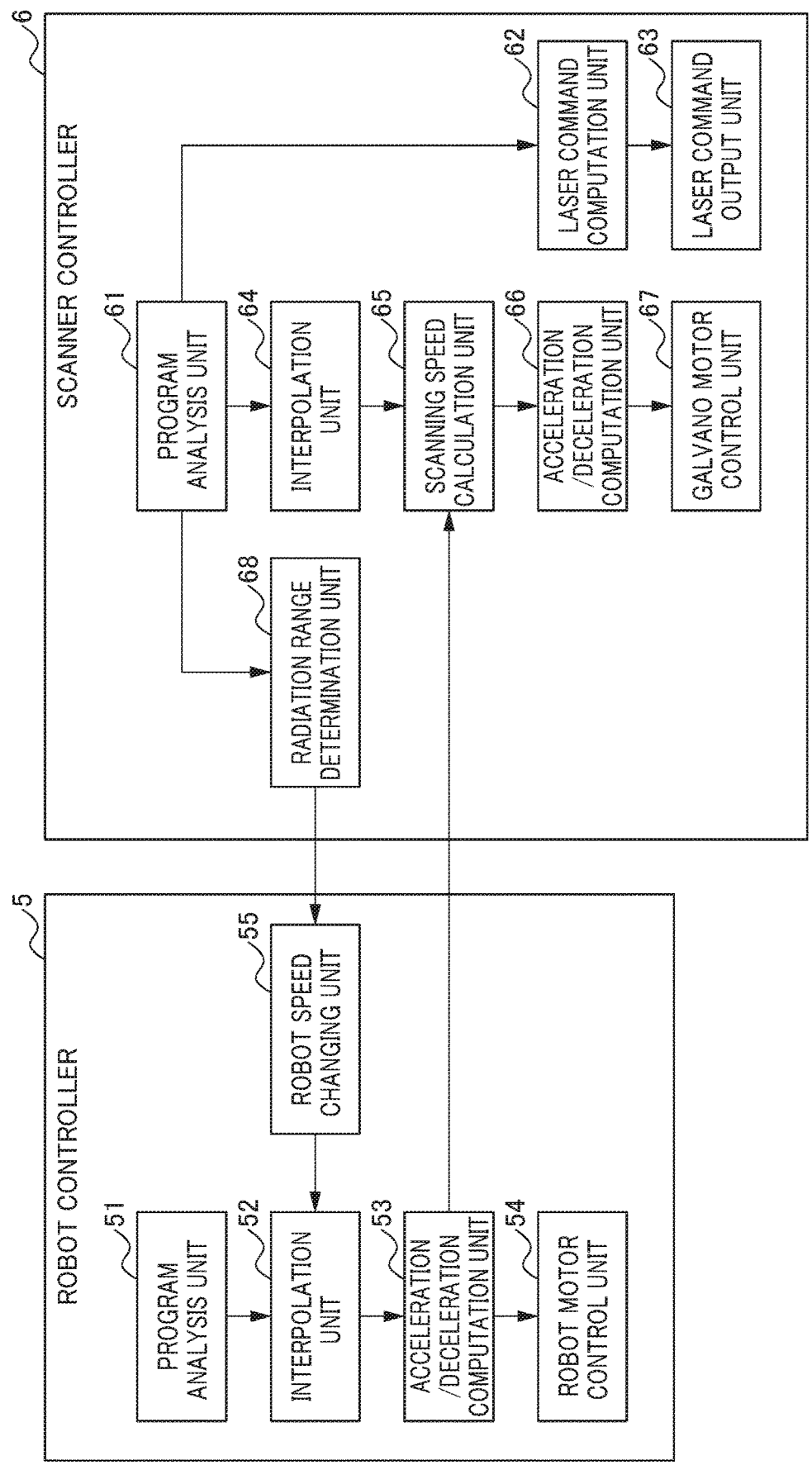
FIG. 5 is a diagram illustrating a configuration of a robot controller and a scanner controller illustrated in FIG. 1.

Next, a more detailed configuration of the robot controller 5 and the scanner controller 6 will be described. FIG. 5 is a diagram illustrating a configuration of the robot controller 5 and the scanner controller 6 of the laser machining system 1 according to the present embodiment. The robot controller 5 includes a program analysis unit 51, an interpolation unit 52, an acceleration/deceleration computation unit 53, and a robot motor control unit 54.

The program analysis unit 51 analyzes a machining program including a teaching point input from an input device (not illustrated) to the robot controller 5 and generates operation command information related to the moving path of the robot 2 (that is, the moving path of the scanner 4 attached to the distal end 22a) and a target move speed of the robot 2. The generated operation command information is output to the interpolation unit 52.

The interpolation unit 52 performs interpolation of the moving path of the robot 2 on the basis of the operation command information output from the program analysis unit 51 and generates interpolation information. For example, the interpolation unit 52 performs interpolation so that the moving path of the robot 2 between teaching points (that is, the moving path of the scanner 4 attached to the distal end 22a) becomes a smooth path following a desired machining path on the work 10. The generated interpolation information is output to the acceleration/deceleration computation unit 53.

The acceleration/deceleration computation unit 53 performs a process of accelerating/decelerating the operation of the robot 2 on the basis of the interpolation information output from the interpolation unit 52 and predetermined parameters and generates driving information for the respective robot servo motors for moving the robot 2 along the moving path of the robot 2 (that is, moving the scanner 4 attached to the distal end 22a along the moving path of the scanner 4). The generated driving information of the respective robot servo motors is output to the robot motor control unit 54. The driving information includes command values of the position and the move speed of the robot 2, and information on the command values of the position and the move speed of the robot 2 is also supplied to the scanner controller 6.

The robot motor control unit 54 generates driving data for the respective robot servo motors on the basis of the driving information output from the acceleration/deceleration computation unit 53. Specifically, the robot motor control unit 54 generates driving data for the respective robot servo motors on the basis of a speed error (or a position error) between a speed command (or a position command) in the driving information and a speed feedback (or a position feedback) detected by an encoder provided in the respective robot servo motors. The robot motor control unit 54 drives the respective robot servo motors on the basis of the generated driving data.

The scanner controller 6 includes a program analysis unit 61, a laser command computation unit 62, a laser command output unit 63, an interpolation unit 64, a scanning speed calculation unit 65, an acceleration/deceleration computation unit 66, and a galvano motor control unit 67.

The program analysis unit 61 analyzes a machining program input from an input device (not illustrated) to the scanner controller 6 and generates operation command information related to a scanning path (a radiation path) and a scanning speed (a radiation speed) of the scanner 4 and machining conditions. The program analysis unit 61 outputs the generated operation command information to the interpolation unit 64 and the laser command computation unit 62.

The laser command computation unit 62 generates laser output information such that the laser beam L emitted from the scanner 4 has a desired laser output on the basis of the operation command information (the machining conditions) output from the program analysis unit 61 and generates oscillation information for the laser oscillator 3 on the basis of the generated laser output information. The generated oscillation information of the laser oscillator 3 is output to the laser command output unit 63.

The laser command output unit 63 generates oscillation control data for the laser oscillator 3 on the basis of the oscillation information output from the laser command computation unit 62 and controls the laser oscillator 3 on the basis of the generated oscillation control data.

The interpolation unit 64 performs interpolation of the scanning path (the radiation path) of the scanner 4 on the basis of the operation command information (the scanning path) output from the program analysis unit 61 and generates interpolation information. The generated interpolation information is output to the scanning speed calculation unit 65.

The scanning speed calculation unit 65 corrects the interpolation information (the scanning path) output from the interpolation unit 64 by taking the operation of the robot into consideration on the basis of the interpolation information (the scanning path) output from the interpolation unit 64 and the robot speed information (for example, a command value of the move speed of the robot 2 or a speed feedback value from the encoder of the robot servo motors) obtained from the acceleration/deceleration computation unit 53 of the robot controller 5. The rotation speed of the respective galvano mirrors 41 and 42 is calculated on the basis of the corrected interpolation information (the scanning path) and the predetermined parameters. The rotation speed data calculated by the scanning speed calculation unit 65 is output to the acceleration/deceleration computation unit 66.

The acceleration/deceleration computation unit 66 performs a process of accelerating/decelerating the galvano motors 41a and 42a on the basis of the respective parameters and the rotation speed information of the galvano mirrors 41 and 42 output from the scanning speed calculation unit 65 and generates driving information for the galvano motors 41a and 42a for scanning the laser beam L along the scanning path (the radiation path) and at the scanning speed (the radiation speed). The generated driving information of the galvano motors 41a and 42a is output to the galvano motor control unit 67.

The galvano motor control unit 67 generates driving control data for the galvano motors 41a and 42a on the basis of the driving information output from the acceleration/deceleration computation unit 66 and drives the galvano motors 41a and 42a on the basis of the generated driving control data.

Figure 11A:
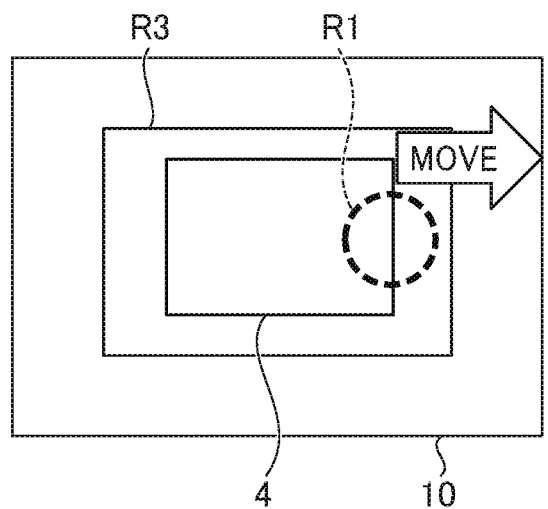
FIG. 11A is a diagram illustrating problems of a laser machining system according to the present embodiment.

Here, the scanner controller 6 recognizes the start of laser machining on the basis of the position of the robot 2 supplied from the robot controller 5 (that is, the position of the scanner 4) and performs operation control of the scanner 4 independently from the operation control of the robot 2 by the robot controller 5. Specifically, as illustrated in FIG. 11A, when the position of the robot 2 (that is, the position of the scanner 4) reaches a predetermined position in relation to the work 10, the scanner controller 6 starts scanning the laser beam on the basis of a predetermined radiation path R1.

Figure 11B:
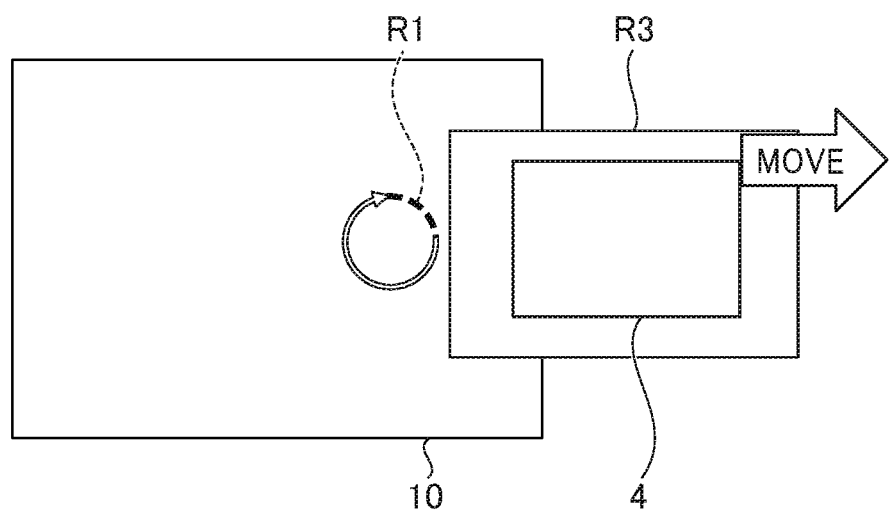
FIG. 11B is a diagram illustrating problems of the laser machining system according to the present embodiment.

However, when the scanning speed of the radiation path R1 by the scanner controller 6 is controlled independently from the move speed of the robot 2 by the robot controller 5, the move speed may become larger than the scanning speed of the scanner 4. In this case, as illustrated in FIG. 11B, the robot 2 (that is, the scanner 4) may move too much before scanning of the laser beam by the scanner controller 6 along the radiation path R1 ends, and the radiation path R1 may deviate from a radiation range R3 of the scanner 4.

In this regard, the scanner controller 6 of the present embodiment includes a radiation range determination unit 68 and the robot controller 5 of the present embodiment includes a robot speed changing unit 55.

The radiation range determination unit 68 calculates the range of the radiation path R1 of the scanner 4 on the basis of the operation command information (the scanning path) output from the program analysis unit 61. The radiation range determination unit 68 determines whether the calculated range of the radiation path R1 exceeds a radiation range R3 of the scanner 4 within a radiation time of the radiation path R1 and transmits a determination result to the robot speed changing unit 55 of the robot controller 5 as radiation range determination information. Moreover, when the range of the radiation path R1 exceeds the radiation range R3 of the scanner 4, the radiation range determination unit 68 computes an optimal scanner move speed so that the calculated range of the radiation path R1 does not exceed the radiation range R3 and embeds the optimal scanner move speed in the radiation range determination information. The radiation range determination unit 68 performs the radiation range determination operation when the robot 2 (that is, the scanner 4) reaches a radiation start position (that is, the start position of the radiation path R1) on the basis of the position of the robot 2 output from the acceleration/deceleration computation unit 53 of the robot controller 5.

The robot speed changing unit 55 changes (decelerates) the move speed of the robot 2 on the basis of the radiation range determination information and the optimal scanner move speed received from the radiation range determination unit 68 of the scanner controller 6. In this way, the interpolation unit 52 performs interpolation on the basis of the move speed of the robot 2 changed (decelerated) by the robot speed changing unit 55. In this way, the move speed of the scanner 4 is changed. The robot speed changing unit 55 may set the move speed of the robot 2 to 0 to stop the robot 2.

Figure 6:
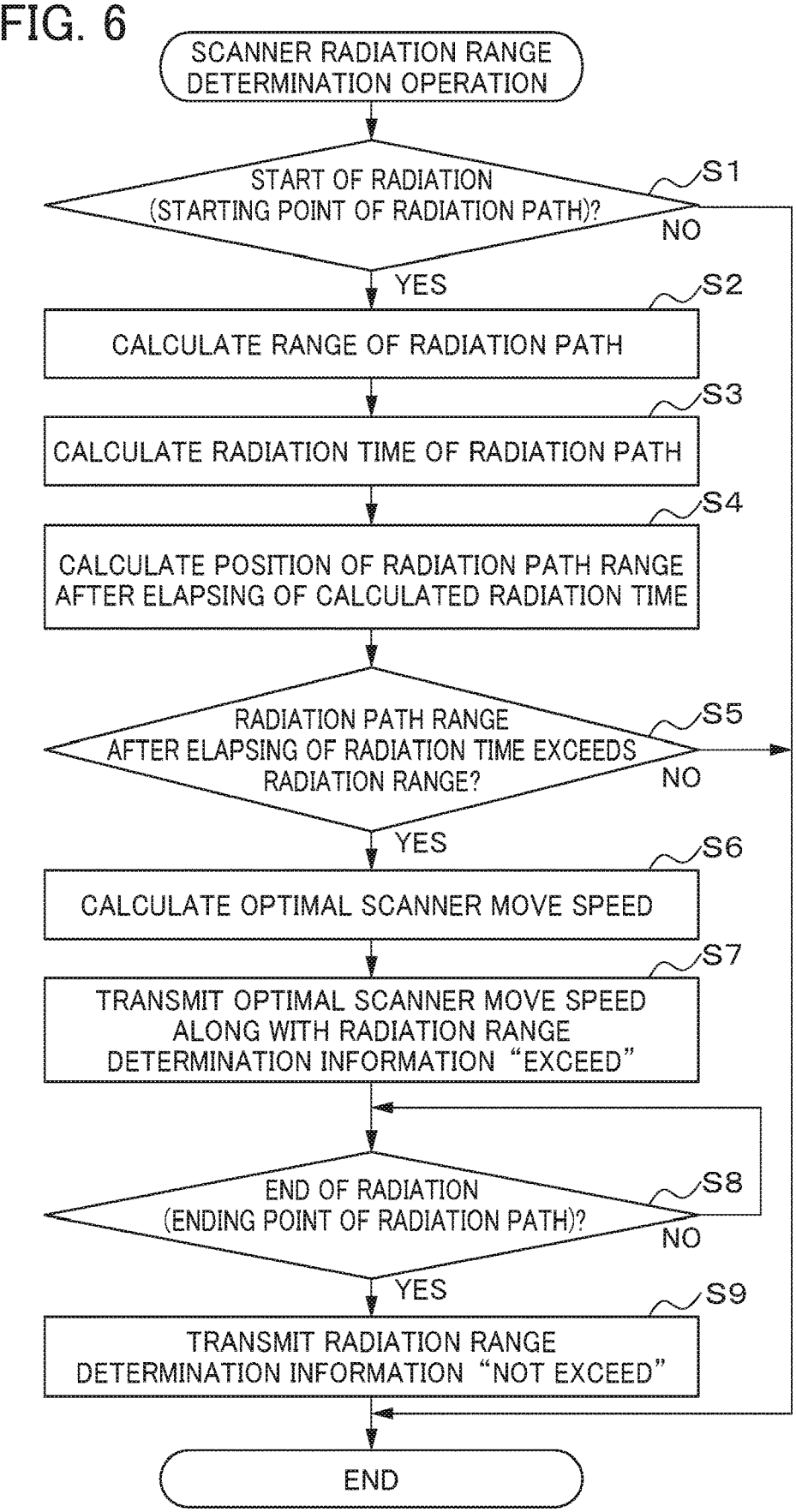
FIG. 6 is a flowchart illustrating a scanner radiation range determination operation by a scanner controller of the laser machining system according to the present embodiment.
Figure 7A:
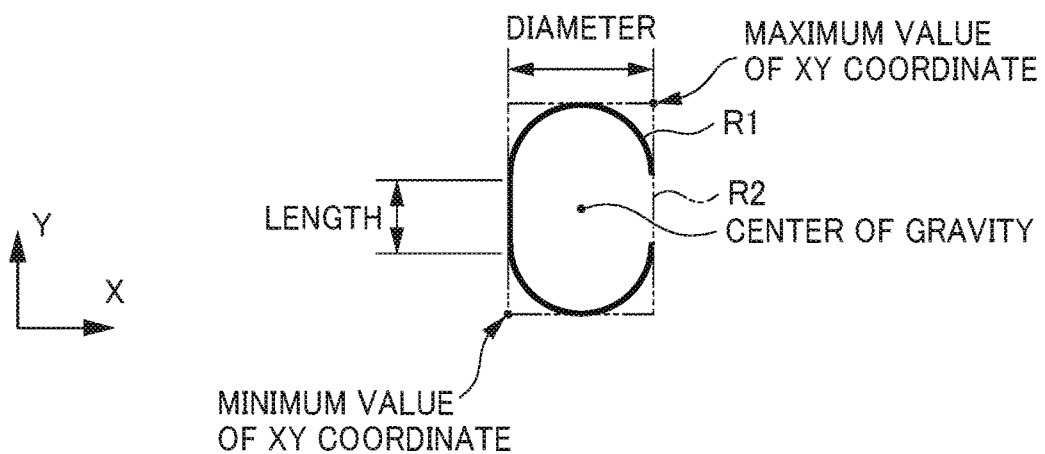
FIG. 7A is a diagram illustrating a method of calculating a radiation path range of a scanner.
Figure 7B:
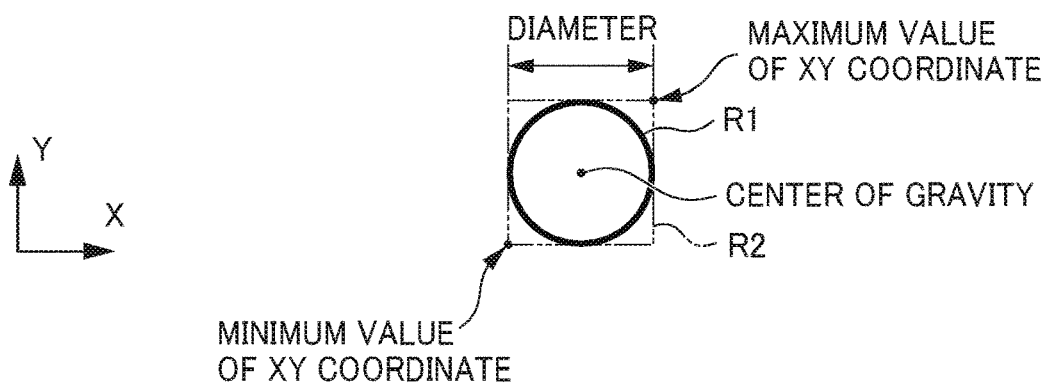
FIG. 7B is a diagram illustrating a method of calculating a radiation path range of the scanner.
Figure 7C:
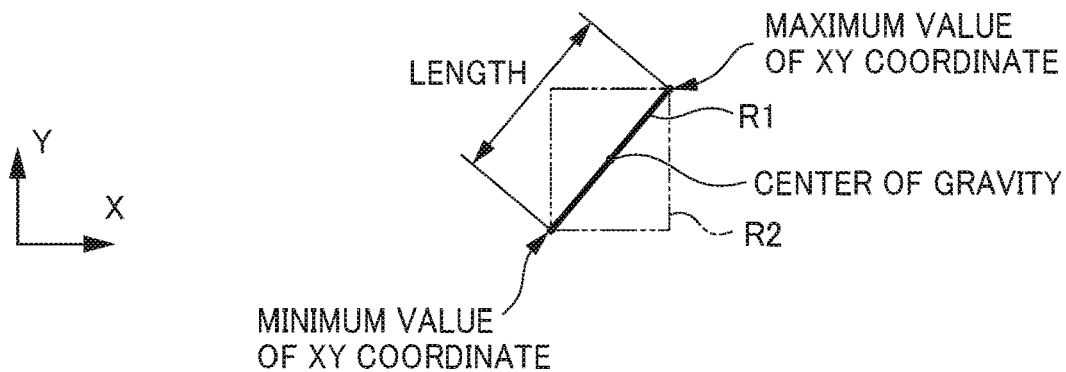
FIG. 7C is a diagram illustrating a method of calculating a radiation path range of the scanner.
Figure 8:
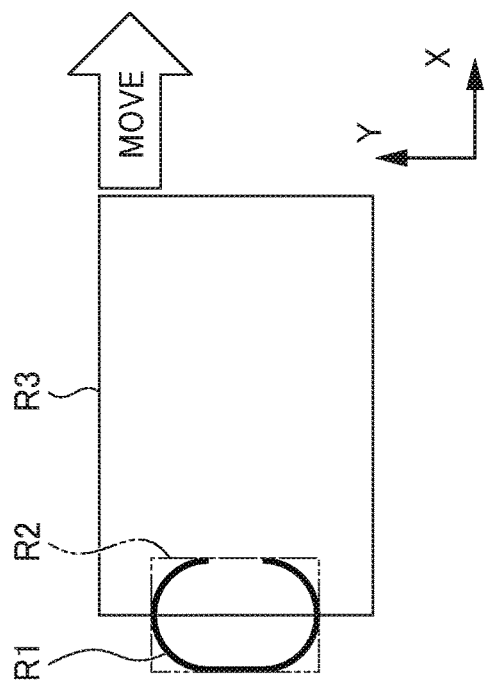
FIG. 8 is a diagram illustrating a method of determining a radiation path range with respect to a scanner radiation range when a radiation time has elapsed.
Figure 8:
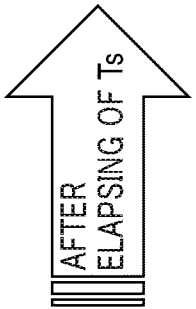
Figure 8:
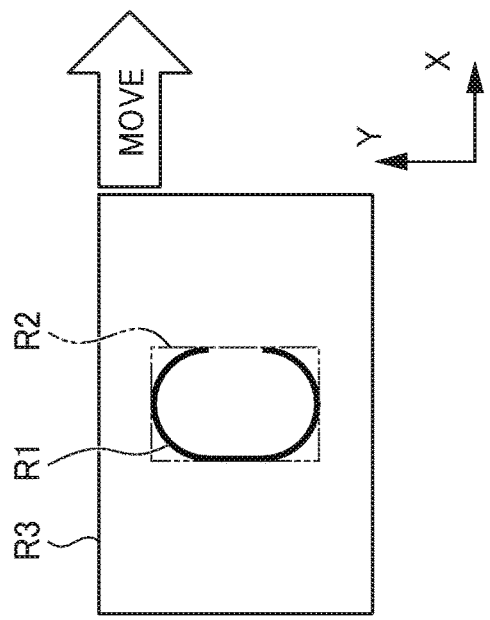
Figure 9:
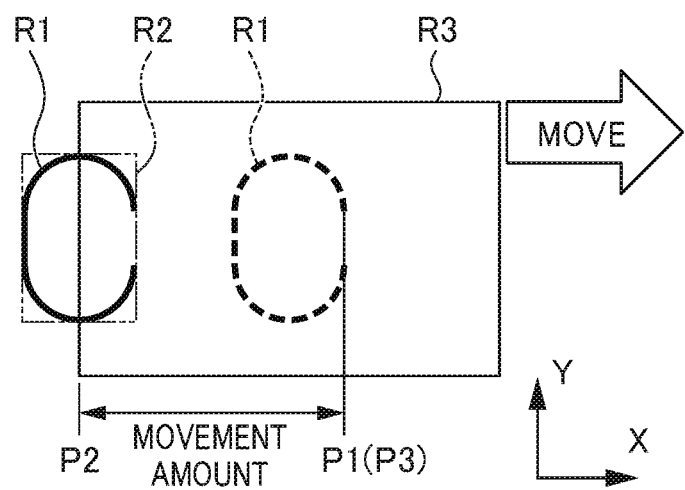
FIG. 9 is a diagram illustrating a method of calculating an optimal scanner move speed.

Next, by referring to FIGS. 6 to 9, a scanner radiation range determination operation by the scanner controller 6 of the laser machining system 1 will be described. FIG. 6 is a flowchart illustrating a scanner radiation range determination operation by the scanner controller 6 of the laser machining system 1 according to the present embodiment. FIGS. 7A to 7C are diagrams illustrating a method of calculating a radiation path range of the scanner and FIG. 8 is a diagram illustrating a method of determining a radiation path range of the radiation range of the scanner when a radiation time has elapsed. FIG. 9 is a diagram illustrating a method of calculating an optimal scanner move speed.

First, the scanner controller 6 determines whether radiation (scanning) of the scanner 4 starts. For example, the scanner controller 6 determines whether the position of the robot 2 acquired from the robot controller 5 (that is the position of the scanner 4 attached to the distal end 22a of the robot 2) is a starting point of the radiation path (the scanning path) (S1).

When the position of the robot 2 is the starting point of radiation (that is, the radiation path), the radiation range determination unit 68 computes the range of the radiation path (S2). For example, as illustrated in FIG. 7A, when a radiation path R1 (indicated by a solid line) is a C-mark shape, the radiation range determination unit 68 calculates the maximum value of the XY coordinates and the minimum value of the XY coordinates of a minimum rectangular radiation path range R2 (indicated by a dot line) surrounding the radiation path R1 from the information indicating the radiation path R1 (the length of a linear portion and a diameter of a curve portion of the C-mark shape). For example, the radiation range determination unit 68 calculates the maximum value [Xmax, Ymax] (positive value) of the XY coordinates and the minimum value [Xmin, Ymin] (negative value) of the XY coordinates with respect to the center of gravity [X, Y]. Moreover, as illustrated in FIG. 7B, when the radiation path R1 (indicated by a solid line) has a circular shape, the radiation range determination unit 68 calculates the maximum value of the XY coordinates and the minimum value of the KY coordinates of a minimum rectangular radiation path range R2 (indicated by a dot line) surrounding the radiation path R1 from the information indicating the radiation path R1 (the diameter of the circular shape). For example, the radiation range determination unit 68 calculates the maximum value [Xmax, Ymax] (positive value) of the XY coordinates and the minimum value [Xmin, Ymin] (negative value) of the XY coordinates with respect to the center of gravity [X, Y]. Moreover, as illustrated in FIG. 7C, when the radiation path R1 (indicated by a solid line) has a linear shape, the radiation range determination unit 68 calculates the maximum value of the XY coordinates and the minimum value of the XY coordinates of a minimum rectangular radiation path range R2 (indicated by a dot line) surrounding the radiation path R1 from the information indicating the radiation path R1 (the length of the linear shape). For example, the radiation range determination unit 68 calculates the maximum value [Xmax, Ymax] (positive value) of the XY coordinates and the minimum value [Xmin, Ymin] (negative value) of the XY coordinates with respect to the center of gravity [X, Y]. The shape of the radiation path is not limited to a C-mark shape, a circular shape, or a linear shape, and may be various arbitrary shapes.

Subsequently, the radiation range determination unit 68 calculates a radiation time Ts from the starting point to the ending point of the radiation path by the following equation on the basis of the radiation path and the radiation speed.

(Radiation time $Ts$)=(Entire length of radiation path)/(Radiation speed)

Subsequently, as illustrated in FIG. 8, the radiation range determination unit 68 computes the position of the radiation path range R1 after the elapsing of the radiation time Ts on the basis of the present move speed of the robot 2 acquired from the robot controller 5 (S4). Subsequently, the radiation range determination unit 68 compares the position of the radiation path range R2 after the elapsing of the computed radiation time Ts with the radiation range R3 of the scanner 4 and determines whether the radiation path range R2 exceeds the radiation range R3 (S5).

As illustrated in FIG. 9, when the radiation path range R2 after the elapsing of the radiation time Ts exceeds the radiation range R3 of the scanner 4, the radiation range determination unit 68 computes an optimal scanner move speed by the following equation so that the radiation path range R2 after the elapsing of the radiation time Ts does not exceeds the radiation range R3 of the scanner 4 (S6).

(Optimal scanner move speed)=(Movement amount from starting point $P1$ of radiation path $R1$ to ending point $P2$ of radiation range $R3$)/(Radiation time $Ts$)

The radiation range determination unit 68 may calculate the optimal scanner move speed so that the entire radiation path range R2 after the elapsing of the radiation time Ts does not exceed the radiation range R3 of the scanner 4. Alternatively, as illustrated in FIG. 9, the radiation range determination unit 68 may calculate the optimal scanner move speed so that a portion near the ending point P3 of the radiation path range R2 after the elapsing of the radiation time Ts does not exceed the radiation range R3 of the scanner 4.

Subsequently, the radiation range determination unit 68 transmits a determination result of "exceed" along with the optimal scanner move speed to the robot speed changing unit 55 of the robot controller 5 as the radiation range determination information (S7).

Subsequently, the scanner controller 6 determines whether radiation (scanning) of the scanner 4 ends. For example, the scanner controller 6 determines whether the position of the robot 2 acquired from the robot controller 5 (that is, the position of the scanner 4 attached to the distal end 22a of the robot 2) is an ending point of the radiation path (S8). When the position of the robot 2 has reached the ending point of radiation (that is, the radiation path), the scanner controller 6 transmits a determination result of "not exceed" to the robot speed changing unit 55 of the robot controller 5 as the radiation range determination information (S9).

Figure 10:
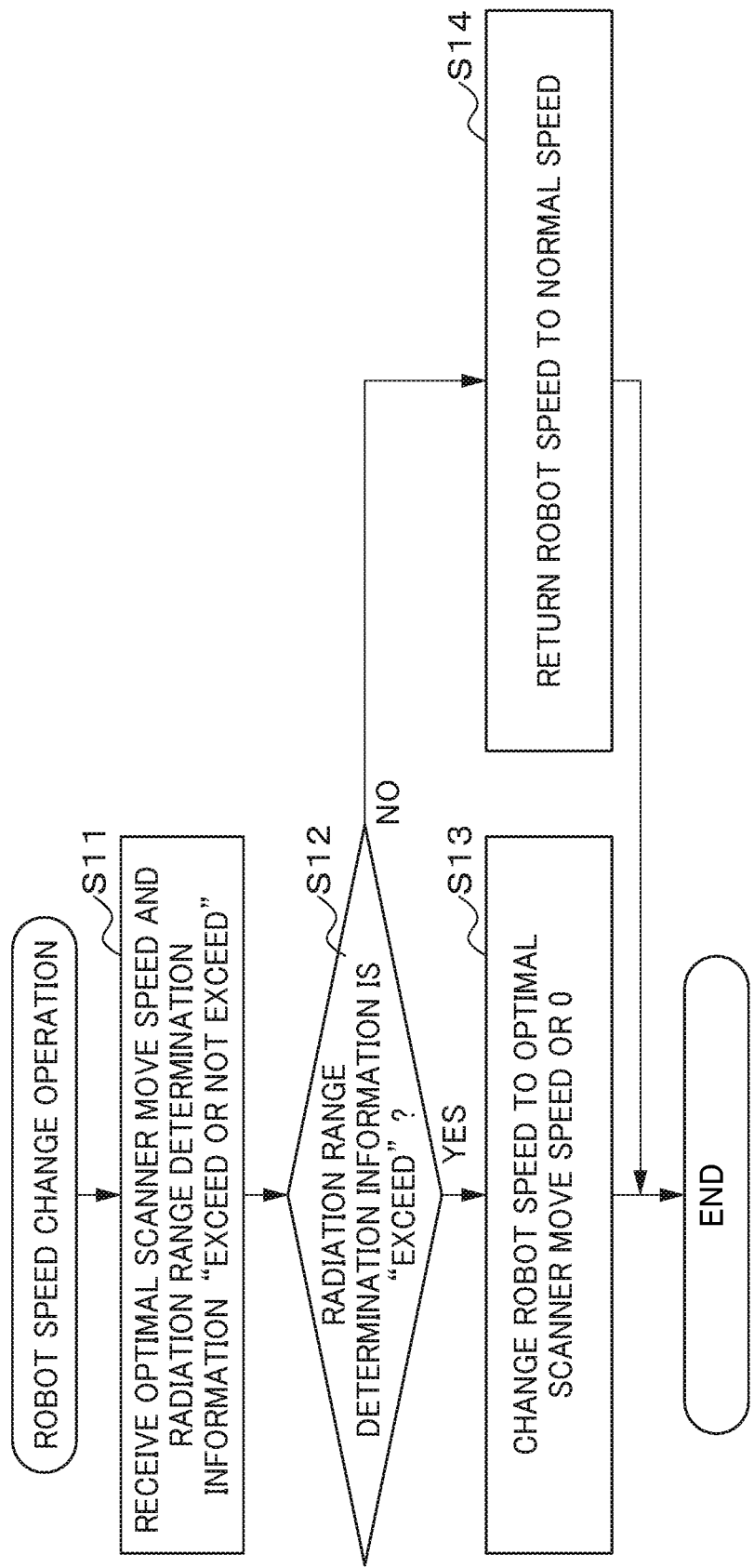
FIG. 10 is a flowchart illustrating a robot speed change operation by a robot controller of the laser machining system according to the present embodiment.

Next, referring to FIG. 10, a robot speed change operation by the robot controller 5 of the laser machining system 1 will be described. FIG. 10 is a flowchart illustrating a robot speed change operation by the robot controller 5 of the laser machining system 1 according to the present embodiment.

First, the robot speed changing unit 55 receives the radiation range determination information and the optimal scanner move speed from the radiation range determination unit 68 of the scanner controller 6 (S11). The robot speed changing unit 55 determines whether the radiation range determination information indicates "exceed" on the basis of the radiation range determination information (S12).

When the radiation range determination information indicates "exceed," the robot speed changing unit 55 changes (decelerates) the robot speed to the received optimal scanner move speed (S13). The robot speed changing unit 55 may change the robot speed to 0 and temporarily stop the robot 2.

On the other hand, when the radiation range determination information indicates "not exceed" in step S12, the robot speed changing unit 55 returns the robot speed to a normal speed (S14).

As described above, according to the laser machining system 1 of the present embodiment, the scanner controller 6 determines whether the range R2 of the predetermined radiation path R1 exceeds the radiation range R3 of the scanner 4 within the radiation time of the predetermined radiation path R1 and transmits (notifies) the determination result to the robot controller 5 as radiation range determination information. The robot controller 5 changes the robot speed (that is, the predetermined move speed) to be decelerated before the range R2 of the predetermined radiation path R1 of the scanner 4 exceeds the radiation range of the scanner 4 on the basis of the radiation range determination information received from the scanner controller 6. In this way, it is possible to perform laser machining appropriately even when the robot controller 5 and the scanner controller 6 operate independently according to individual operation programs (that is, even when control of the moving path and the move speed of the robot 2 by the robot controller 5 is independent from control of the scanning path (radiation path) and the scanning speed (radiation speed) of the scanner 4 by the scanner controller 6). Moreover, it is possible to alleviate the time and effort of correcting the programmed move speed of the robot 2 by trial-and-error.

According to the laser machining system 1 of the present embodiment, the scanner controller 6 computes the optimal scanner move speed so that the radiation path R1 after the elapsing of the radiation time Ts does not exceed the radiation range R3 of the scanner 4 on the basis of the movement amount from the starting position P1 of the predetermined radiation path R1 to the ending point P2 of the radiation range R3 of the scanner 4 and the radiation time Ts from start to end of the predetermined radiation path R1 and transmits the computed optimal scanner move speed by embedding the same in the radiation range determination information. The robot controller 5 changes the predetermined move speed to the optimal scanner move speed included in the radiation range determination information. In this way, it is possible to perform laser machining more appropriately.

While an embodiment of the present invention has been described, the present invention is not limited to the above-described embodiment and can be chanced and modified in various ways. For example, the above-described embodiment has illustrated a laser welding system that performs laser welding, but it is not limited thereto. The features of the present embodiment can be applied to systems that perform various types of laser machining such as laser cutting using a scanner scanning a laser beam and a robot that moves the scanner.

EXPLANATION OF REFERENCE NUMERALS

1: Laser machining system
2: Robot
3: Laser oscillator
4: Scanner
41, 42: Galvano mirror
41a, 42a: Galvano motor
5: Robot controller
51: Program analysis unit
52: Interpolation unit
53: Acceleration/deceleration computation unit
54: Robot motor control unit
55: Robot speed changing unit
6: Scanner controller
61: Program analysis unit
62: Laser command computation unit
63: Laser command output unit
64: Interpolation unit
65: Scanning speed calculation unit
66: Acceleration/deceleration computation unit
67: Galvano motor control unit
68: Radiation range determination unit
10: Work

What is claimed is:

1. A laser machining system comprising:
a scanner that scans a laser beam along a predetermined radiation path and at a predetermined radiation speed;
a robot that moves the scanner along a predetermined moving path and at a predetermined move speed;
a memory configured to store one or more programs; and
a processor configured to execute the one or more programs so as to function as:
a robot controller that controls the moving path and the move speed of the robot; and
a scanner controller that controls the radiation path and the radiation speed of the scanner, wherein
the scanner controller determines whether the predetermined radiation path exceeds a radiation range of the scanner within a radiation time of the predetermined radiation path and transmits a determination result to the robot controller as radiation range determination information,
the robot controller changes the predetermined move speed to be decelerated on the basis of the radiation range determination information received from the scanner controller,
the scanner controller computes a move speed of the scanner so that a radiation path after the elapsing of the radiation time does not exceed the radiation range of the scanner on the basis of a starting position of the predetermined radiation path, the radiation range of the scanner, and a radiation time from start to end of the predetermined radiation path, and transmits the computed move speed of the scanner by embedding the same in the radiation range determination information, and
the robot controller changes the predetermined move speed to a move speed of the scanner included in the radiation range determination information.

2. The laser machining system according to claim 1, wherein the robot controller changes the predetermined move speed to 0 and stops the robot.

3. The laser machining system according to claim 1, wherein
the control of the radiation speed of the scanner by the scanner controller is performed independently from the control of the move speed of the robot by the robot controller.

* * * * *